W. H. H. Hallock. Animal Gag.
No. 120,062.  Patented Oct. 17, 1871.
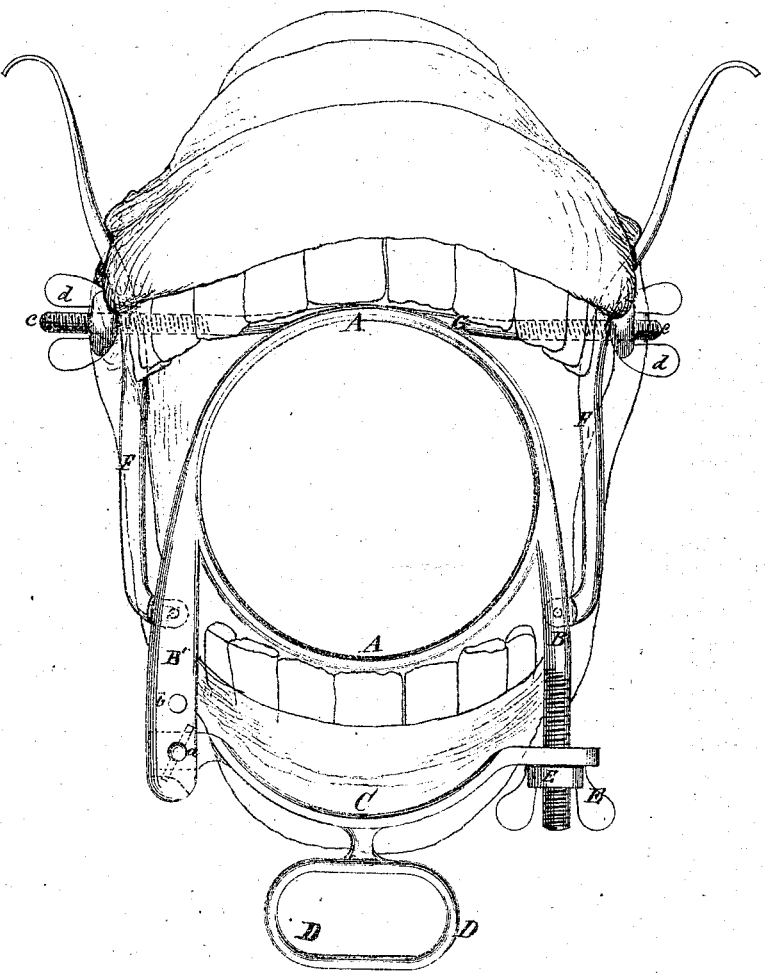
Witnesses.
A. W. Almqvist
Wm. H. C. Smith.
Inventor:
W. H. H. Hallock.
per
Munn &Co
Attorneys.

UNITED STATES PATENT OFFICE.

W. H. HARRISON HALLOCK, OF MATTITUCK, NEW YORK.

IMPROVEMENT IN ANIMAL-GAGS.

Specification forming part of Letters Patent No. 120,062, dated October 17, 1871.

*To all whom it may concern:*

Be it known that I, W. H. HARRISON HALLOCK, of Mattituck, in the county of Suffolk and State of New York, have invented a new and Improved Gag for Animals; and I do hereby declare that the following is a full, clear, and exact description thereof, which will enable others skilled in the art to make and use the same, reference being had to the accompanying drawing forming a part of this specification.

The object of this improvement is to facilitate the relief of animals when choked by the lodgment of substances in the throat; also, to facilitate the administration of medicines to animals.

The drawing represents a front elevation of my improvement.

A is a ring, of metal or other suitable material, of sufficient size to permit the arm of the attendant to pass through after the ring has been inserted in an animal's mouth for the purpose of administering medicine or extracting any substance which may be lodged in the animal's throat. Projecting from the sides of the ring A are two ears, B B', and pivoted to the latter, at *a*, is a curved cross-bar, C, provided with a handle, D. The said cross-bar is also provided with an aperture at one end, which permits it to pass over the extremity of the ear B, upon which is a screw-thread, the cross-bar being held upon the ear by a nut, E, as shown. The opposite end of the cross-bar C is flattened and fits within a slot in the ear B', being secured therein by a screw-pivot, *a*, which passes through the ear B' and through the cross-bar. When it is desired to change the space between the ring A and cross-bar C the pivot *a* is removed, and the bar C moved in the slot until the pivot *a* can be passed through the aperture *b*. This adjustability of the cross-bar C adapts the instrument to the varying sizes of the jaws of different animals.

The manner of applying my improvement is as follows: The nut E is removed from the ear B; then the cross-bar or gripe C is pulled off of the ear B, with the cross-bar C hanging downward upon the ear B'; the ring A is then inserted in the mouth of the animal, as shown in the drawing. The cross-bar or gripe C is then brought up, its extremity passing over the ear B, so that the bar will come in contact with the lower jaw of the animal, where it is firmly secured by the nut E, as shown. In this position the head of the animal may be moved to any desired angle by means of the handle D; and the jaws being kept apart by the ring A, the operator may readily extract any obstacle that may be lodged in the throat of the animal, or may administer medicine.

In some cases, when the animal is unruly or vicious, and it is desirable to hold the head of the animal firmly to prevent lateral movement thereof, I provide the adjustable side bearers F F, which are pivoted at their lower ends to the ears B B'. The bearers F F press on the sides of the animal's mouth, as shown. The said bearers are adjusted by means of thumb-nuts *d d*, which work on the horizontal rod G, which is attached, as shown, or in any suitable manner, to the ring A, the extremities of the rod G being provided with screw-threads *c*, on which the nuts *d* work. The bearers F F are outwardly curved at their upper extremities to facilitate the placing of the instrument upon the animal.

The various parts of the instrument that come in contact with the animal's mouth are to be covered with rubber or other suitable material to protect the animal from injury.

I do not limit or confine myself to the exact form of any of the parts herein described, as they may be varied without departing from my invention.

Having thus described my invention, I claim as new and desire to secure by Letters Patent—

1. The combination, with the ring A, of the adjustable cross-bar C, substantially as and for the purpose herein set forth.

2. The handle D combined with the cross-bar, substantially as described.

3. The combination of the adjustable bearers F and rod G with the ring A, substantially as and for the purpose herein set forth.

W. H. HARRISON HALLOCK.

Witnesses:
CHAS. E. BENJAMIN,
J. F. HORTON.

(144)